(12) United States Patent
Johnson (10) Patent No.: US 8,536,734 B2
(45) Date of Patent: Sep. 17, 2013

(54) APPARATUS FOR INVERTING DC VOLTAGE TO AC VOLTAGE (75) Inventor: Douglas A. Johnson, Groveland, MA (US)

(73) Assignee: East Coast Research and Development, LLC, Groveland, MA (US)

( * ) Notice: Subject to any disclaimer, the term of this patent is extended or adjusted under 35 U.S.C. 154(b) by 249 days.

(21) Appl. No.: 12/760,160

(22) Filed: Apr. 14, 2010

(65) Prior Publication Data

US 2011/0254373 A1    Oct. 20, 2011

(51) Int. Cl.
*H02J 1/00* (2006.01)
*H02J 3/00* (2006.01)

(52) U.S. Cl.
USPC ............................................. 307/77

(58) Field of Classification Search
USPC ................. 307/43, 77, 80, 81; 320/120, 121
See application file for complete search history.

(56) References Cited

U.S. PATENT DOCUMENTS

| 5,642,275 | A | 6/1997 | Peng et al. |
| 6,075,350 | A | 6/2000 | Peng |
| RE37,126 | E | 4/2001 | Peng et al. |
| 6,430,692 | B1 * | 8/2002 | Kimble et al. ................ 713/300 |
| 6,577,087 | B2 | 6/2003 | Su |
| 6,969,967 | B2 | 11/2005 | Su |
| 7,046,531 | B2 * | 5/2006 | Zocchi et al. ................... 363/65 |
| 2006/0044857 | A1 | 3/2006 | Lemak |
| 2009/0102436 | A1 | 4/2009 | Escobar Valderrama et al. |

* cited by examiner

*Primary Examiner* — Carlos Amaya
(74) *Attorney, Agent, or Firm* — Brooks Kushman P.C.

(57) ABSTRACT

An apparatus for inverting DC voltage to AC voltage by stacking of DC voltage sources from a series of DC voltage sources comprises a plurality of circuits. Each circuit includes a first power switch, a second power switch, and a third power switch. The first power switch allows selective connection of adjacent DC voltage sources in the series to provide stacking of DC voltage sources. The second power switch allows selective connection of a first bus to a corresponding location between adjacent DC voltage sources. The third power switch allows selective connection of a second bus to a corresponding location between adjacent DC voltage sources. Controlling the plurality of power switches produces an AC voltage output by coordinating stacking of DC voltage sources and associated connections to the first bus and the second bus.

18 Claims, 6 Drawing Sheets

APPARATUS FOR INVERTING DC VOLTAGE TO AC VOLTAGE

BACKGROUND OF THE INVENTION

1. Field of the Invention

The invention relates to an apparatus for inverting DC voltage to AC voltage by stacking of DC voltage sources from a series of DC voltage sources.

2. Background Art

There are many different types and sizes of inverters. The typical inverter arrangement has batteries that are hard connected in a series and/or parallel configuration, with a final set of battery connections delivering the resulting DC voltage to the inverter. This type of series/parallel battery arrangement makes for difficult battery maintenance because the heavy gauge, hard wired connections, and heavy current draw under load make it hard to diagnose an individual battery. If any one battery becomes defective, the series string that includes the defective battery will begin drawing current from a good string. This can be a difficult to detect situation, and results in reduced operational efficiency.

There are also several existing methods for stacking independent voltage sources in series for the purpose of power conversion. These power conversion approaches have been referred to using various names including multilevel converter, cascade inverter, cascade multilevel inverter, multilevel voltage source inverter, multilevel DC link inverter, and multilevel DC bus inverter. The differences among the various power conversion approaches have primarily to do with topologies, or the type of semiconductors used, and how they are connected.

These existing topologies for stacking independent voltage sources in series, although used for commercially successful applications, have certain disadvantages. Typically, all the power switching nodes (sub-circuits where H-bridges, or half-bridges, or discreet switching elements connect to the independent voltage sources used for any half AC wave output) must all be powered at all times while the inverter is generating AC voltage. In addition, the resulting current delivered to the load typically must pass through all of the switching nodes (or at least all the nodes used in any half AC wave) before being delivered to the load.

Further background information may be found in U.S. Pat. Nos. 5,642,275; 6,075,350; RE37,126; 6,577,087; and 6,969,967. Further background information may also be found in U.S. Pub. Nos. 2006/0044857; and 2009/0102436.

For the foregoing reasons, there is a need for an improved apparatus for inverting DC voltage to AC voltage.

SUMMARY OF THE INVENTION

In one embodiment of the invention, an apparatus for inverting DC voltage to AC voltage by stacking of DC voltage sources from a series of DC voltage sources is provided. The apparatus comprises a plurality of power switches including first power switches, second power switches, and third power switches. The first power switches are arranged to allow selective connection of adjacent DC voltage sources in the series to provide stacking of DC voltage sources. Each second power switch is arranged to allow selective connection of a first bus to a corresponding location between adjacent DC voltage sources. Each third power switch is arranged to allow selective connection of a second bus to a corresponding location between adjacent DC voltage sources. The apparatus further comprises a controller operative to control the plurality of power switches to produce an AC voltage output by coordinating stacking of DC voltage sources and associated connections to the first bus and the second bus.

It is appreciated that the controller may coordinate stacking of DC voltage sources in a variety of ways. The arrangement of the first, second, and third power switches with respect to the DC voltage sources and first and second buses provides numerous possibilities. In one contemplated approach, coordinating stacking of DC voltage sources includes a sequence of coordination steps where DC voltage sources are incrementally connected in series and incrementally removed from the series connection. The plurality of power switches may further include fourth power switches arranged to form an H-bridge having an input side connected to the first and second buses and having an output side. The controller may be further operative such that coordinating stacking of DC voltage sources includes reversing the H-bridge between sequences.

At the more detailed level, the invention comprehends a variety of additional features that may be used individually or in appropriate combinations depending on the application. Forming an H-bridge with power switches connected to the first and second buses is one possible feature.

In a contemplated implementation, the apparatus further comprises a plurality of circuits including the plurality of power switches. Each circuit includes at least one first power switch, at least one second power switch, and at least one third power switch. The apparatus may further include a plurality of printed circuit boards, with each printed circuit board including at least one of the circuits. The plurality of printed circuit boards may be connected together in a series, with each printed circuit board associated with and connectable to both terminals of a DC voltage source. It is appreciated that the DC voltage source is not limited to any particular type of DC voltage source. The series of DC voltage sources may be composed of a series of batteries, or fuel cells, for example. In some embodiments, each printed circuit board is associated with and connectable to a DC voltage source, and includes a battery monitor circuit for measuring at least one operating parameter of the associated DC voltage source.

In some embodiments, a master circuit includes the controller; and a plurality of slave circuits include the plurality of power switches. Each slave circuit includes at least one first power switch, at least one second power switch, and at least one third power switch. A master printed circuit board may include the master circuit, and a plurality of slave printed circuit boards may include the slave circuits.

Further, in another embodiment of the invention, an apparatus for inverting DC voltage to AC voltage by stacking of DC voltage sources from a series of DC voltage sources is provided. The apparatus comprises a plurality of circuits including a plurality of power switches. The plurality of power switches includes first power switches, second power switches, and third power switches. The first power switches are arranged to allow selective connection of adjacent DC voltage sources in the series to provide stacking of DC voltage sources. Each second power switch is arranged to allow selective connection of a first bus to a corresponding location between adjacent DC voltage sources. Each third power switch is arranged to allow selective connection of a second bus to a corresponding location between adjacent DC voltage sources. Each circuit includes at least one first power switch, at least one second power switch, and at least one third power switch.

Various methods of operating the apparatus are also contemplated. For example, one method of operating the apparatus comprises controlling the plurality of power switches to produce an AC voltage output by coordinating stacking of DC voltage sources and associated connections to the first bus and the second bus. Coordinating stacking of DC voltage sources may include a sequence of coordination steps where DC voltage sources are incrementally connected in series and incrementally removed from the series connection. In more detail, the sequence of coordination steps may be continuously repeated while changing a first DC voltage source in the series connection. In addition, coordinating stacking of DC voltage sources may be conducted so as to implement dynamic stacking based on battery operation parameters.

In another aspect of the invention, additional circuitry can be added to facilitate charging the DC voltage sources from low voltage DC sources. In particular, a plurality of pairs of power switches are provided. Each pair of power switches is arranged to allow selective connection of a corresponding DC voltage source to a DC charging voltage for charging the DC voltage source.

In another aspect of the invention, reversing switch mechanisms such as reversing relays can be added to facilitate charging the batteries directly from a high voltage AC source. In more detail, a plurality of switch mechanisms are arranged for reversing connections to the DC voltage sources. Each switch mechanism is associated with a corresponding DC voltage source having first and second terminals. The switch mechanism has a first position in which the first terminal is selectively connectable to the first bus by a corresponding second power switch and the second terminal is selectively connectable to the second bus by a corresponding third power switch. The switch mechanism also has a second position in which the first terminal is selectively connectable to the second bus by the corresponding third power switch and the second terminal is selectively connectable to the first bus by the corresponding second power switch.

Embodiments of the invention provide many advantages. In general, embodiments of the invention may provide conversion of DC voltage from batteries to household AC voltage, without the use of transformers to step-up the low battery voltages. The same hardware apparatus may, in some embodiments, be used in reverse, to charge the inverter batteries directly from household AC voltage, without using a transformer to reduce the incoming high voltage AC to low DC volts for battery charging. Additional circuitry is contemplated which may be added to the inverter which allows low voltage DC charging to take place while the inverter is in use, which is particularly useful for applications involving solar photovoltaic (PV) arrays.

DETAILED DESCRIPTION OF THE PREFERRED EMBODIMENTS

Embodiments of the invention relate to an apparatus for inverting DC voltage to AC voltage by stacking of DC voltage sources from a series of DC voltage sources. The apparatus may be implemented in a variety of ways, depending on the application. Various methods of operation are also contemplated.

In an example embodiment, the inverter circuitry is broken up into multiple circuits, each which could exist on a separate PCB and could connect to one or more batteries. For example, if there were seven 24V batteries, there could be seven separate circuit boards, each connected to its own battery. The circuit boards are then connected together in a series, daisy-chain manner, with multiple connections between the boards, and with power semiconductors on the boards to switch the battery voltage from one board to the next. The arrangement of the power semiconductors and the circuit board interconnects is such that the batteries can be successively connected in series, with the resulting voltage connected to a dedicated set of bus wires.

In this example, in addition to the series connected circuit boards (slave circuits), there is one circuit board that operates as a master, and has two functions. In a first function, the master circuit communicates with the slave circuits to obtain battery information and coordinates the successive series connection of the batteries. In a second function, the master circuit connects the dedicated series voltage bus wires to the input of an H-bridge, so that the polarity of the voltage can be reversed, before connecting to the output terminals. The master circuit coordinates the slave circuits through a sequence of steps, where the batteries are successively connected in series (in this example, voltage increases from 0V DC to 168V DC), and then a separate sequence of steps where they are successively removed from the series connection (voltage decreases from 168V DC to 0V DC). Additionally, in every other half cycle, the H-bridge is reversed so that the increasing/decreasing voltage, as seen by the load, is negative. The end result is that the voltage at the output of the H-bridge is 120V AC, implemented as a 28 step modified AC sine wave (7 steps up and down in each half cycle).

The following description, with reference to FIGS. 1-9, facilitates a better understanding of various features of the invention.

Figure 1:
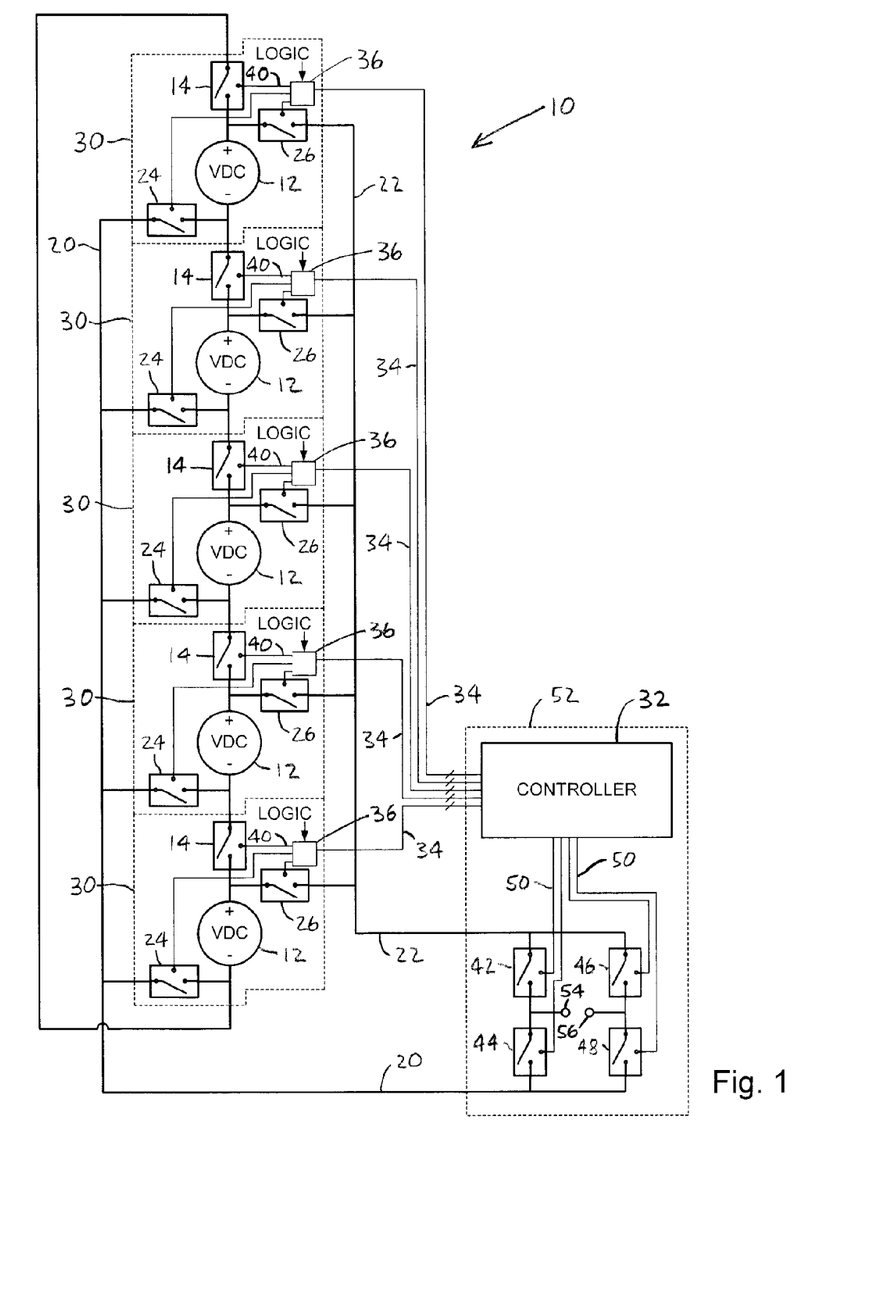
FIG. 1 illustrates an apparatus for inverting DC voltage to AC voltage by stacking of DC voltage sources from a series of DC voltage sources in an embodiment of the invention.

FIG. 1 illustrates an apparatus 10 for inverting DC voltage to AC voltage by stacking of DC voltage sources from a series of DC voltage sources 12. Apparatus 10, shown as a transformerless inverter, includes a plurality of power switches. The power switches may be implemented in any suitable way. As well, DC voltage sources 12 may take a variety of forms even though DC voltage sources 12 are described in the example embodiments as a series of batteries.

First power switches 14 are arranged to allow selective connection of adjacent DC voltage sources 12 to provide stacking of DC voltage sources 12. The bus wires or buses for receiving the resulting voltage from the DC stack include first bus 20 and second bus 22. Second power switches 24 are arranged to allow selective connection to the first bus 20. Specifically, each second power switch 24 is arranged to allow selective connection of the first bus 20 to a corresponding location between adjacent DC voltage sources 12. Third power switches 26 are arranged to allow selective connection to the second bus 22. More specifically, each third power switch 26 is arranged to allow selective connection of the second bus 22 to a corresponding location between adjacent DC voltage sources 12.

As shown, the inverter circuitry for apparatus 10 is composed of a plurality of circuits 30. Each circuit 30 includes a first power switch 14, a second power switch 24, and a third power switch 26.

A controller 32, which is part of a master circuit 52, operates to control the power switches 14, 24, 26 to produce an AC voltage output. In more detail, the controller 32 coordinates stacking of DC voltage sources 12, with first power switches 14, and associated connections to the first bus 20 and the second bus 22, with second switches 24 and third switches 26, respectively.

Controller 32 may coordinate stacking of DC voltage sources 12 in a variety of ways. Further, the controls may be implemented in any suitable way. As shown, controller 32 has a connection 34 to logic 36 at each circuit 30. Logic 36 provides a connection 40 to control each switch 14, 24, 26. The particular technique for controller 32 controlling the switching of switches 14, 24, 26 may take any appropriate form. For example, controller 32 may have a direct connection to each switch, or controller 32 may provide a signal to digital logic that in turn provides control signals to the switches.

The voltage output between first bus 20 and second bus 22 is connected to an H-bridge implemented by power switches 42, 44, 46, 48. Controller 32 has connections 50 to control the H-bridge switches 42, 44, 46, 48, with the output of the H-bridge provided to the output terminals 54, 56.

Figure 2:
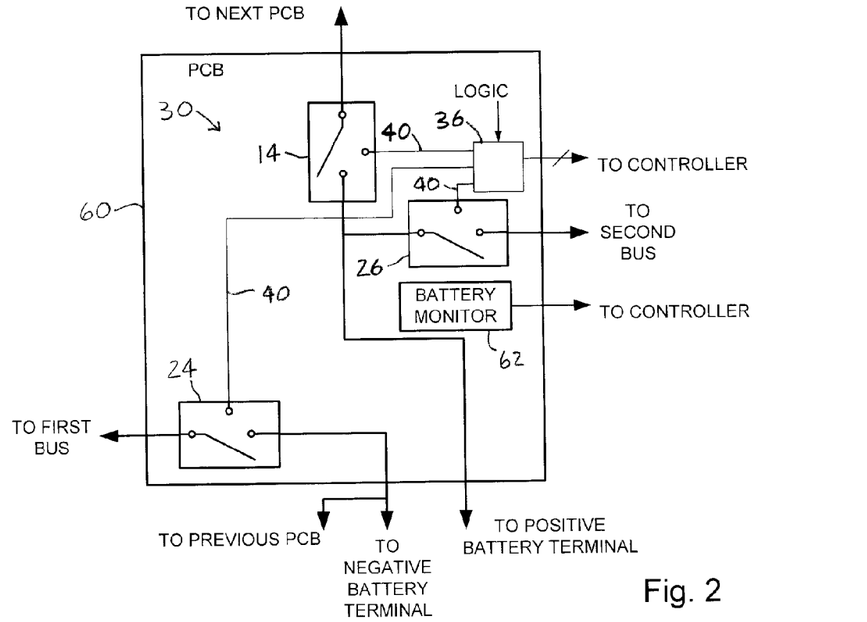
FIG. 2 illustrates a printed circuit board (PCB) including one of the circuits of the apparatus of FIG. 1.

The circuits 30 could each be on a separate PCB. FIG. 2 illustrates a PCB 60 including one of the circuits 30 of the apparatus 10. PCB 60 includes power switches 14, 24, 26; logic 36 and associated connections 40; and battery monitor circuit 62. Battery monitor circuit 62 may be implemented in any suitable way and measures at least one operating parameter of the associated DC voltage source. FIG. 2 illustrates the way the PCB 60 is connected to the positive and negative battery terminals, and to a next PCB and a previous PCB in a series of PCBs. Connections to the first bus 20, second bus 22, and controller 32 are also depicted.

Figure 3:
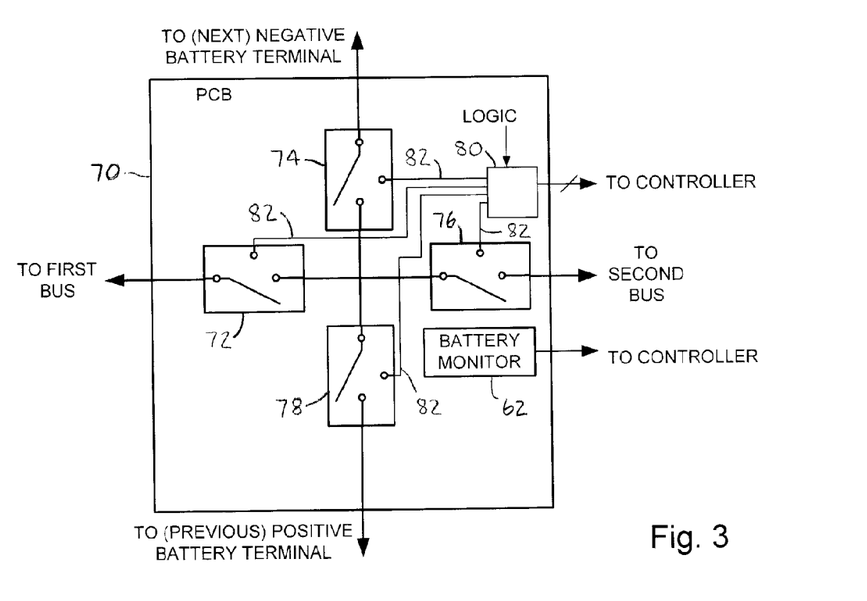
FIG. 3 illustrates a printed circuit board (PCB) including an alternative circuit.

It is appreciated that the arrangement of the power switches may be made in various ways that allow stacking of DC voltage sources and associated connections to the bus wires. FIG. 3 illustrates a PCB 70 including an alternative circuit. As shown, power switches 72, 74, 76, 78 are arranged to allow selective connection of adjacent DC voltage sources in the series, to allow selective connection to the first bus 20 and to allow selective connection to the second bus 22. In more detail, the circuit in FIG. 3 is similar to the circuit shown in FIG. 2, and includes logic 80 with connections 82 to the power switches 72, 74, 76, 78. In the FIG. 3 arrangement, each PCB 70 is located between a pair of batteries with a connection to the next battery and a connection to the previous battery. Connections to the first bus 20, second bus 22, and controller 32 are also depicted. This is an example alternative circuit, other alternatives are possible.

Figure 4:
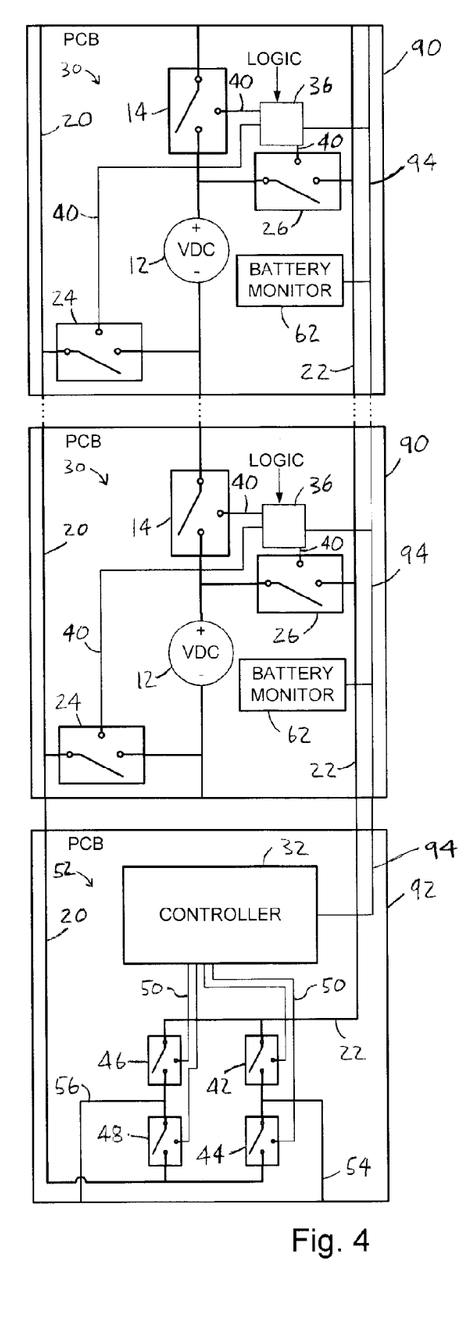
FIG. 4 illustrates a plurality of printed circuit boards (PCBs) connected together in a series in an embodiment of the invention.

FIG. 4 illustrates a plurality of PCBs 90 connected together in a series. In more detail, a plurality of slave PCBs 90 are connected in series, with the series also including a master PCB 92. Each slave PCB 90 includes a slave circuit 30. Slave PCBs 90 in FIG. 4 are similar to PCB 60 of FIG. 2. In FIG. 4, the first bus 20 and the second bus 22 are shown on the PCB 90. As well, a control bus 94 is shown in place of the individual connections to the controller 32. Master PCB 92 includes master circuit 52, including the controller 32, the H-bridge power switches 42, 44, 46, 48, and other associated components.

Figure 5:
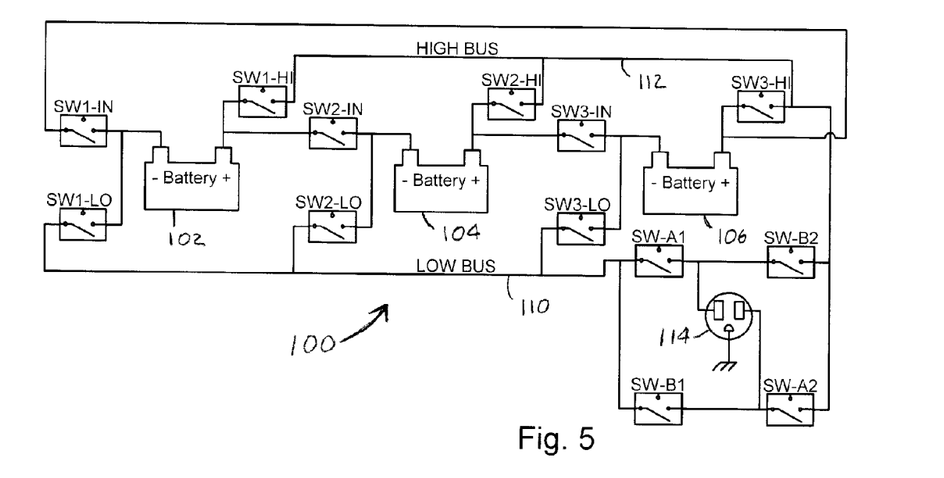
FIG. 5 illustrates a schematic diagram of a series connected inverter in accordance with the invention.

FIG. 5 illustrates a schematic diagram of a series connected inverter in accordance with the invention. FIG. 5 omits some of the detail from FIG. 1 to facilitate the understanding of an example implementation. The inverter is indicated at 100, with only first, second, and third batteries 102, 104, 106 for simplicity. The power semiconductors are shown as simple switches. The control circuitry for each battery includes first, second, and third switches that are used to successively connect the battery in series with other batteries. The control circuitry for battery 102 includes first switch SW1-IN, second switch SW1-HI, and third switch SW1-LO. The control circuitry for battery 104 includes first switch SW2-IN, second switch SW2-HI, and third switch SW2-LO. The control circuitry for battery 106 includes first switch SW3-IN, second switch SW3-HI, and third switch SW3-LO. The low bus wire is indicated at 110, and the high bus wire is indicated at 112. The additional switches SW-A1, SW-A2, SW-B1, and SW-B2 take the resulting voltage on the low bus 110 and high bus 112 and provide an H-bridge arrangement, the center of which is the 120V AC receptacle 114.

The table shown below shows the sequencing of the switches in the control circuit.

| SW1-LO | SW2-LO | SW3-LO | SW1-IN | SW2-IN | SW3-IN | SW1-HI | SW2-HI | SW3-HI | SW-A1 | SW-A2 | SW-B1 | SW-B2 |
|---|---|---|---|---|---|---|---|---|---|---|---|---|
| 1 | 0 | 0 | 0 | 0 | 0 | 0 | 0 | 0 | 1 | 1 | 0 | 0 |
| 1 | 0 | 0 | 0 | 0 | 0 | 1 | 0 | 0 | 1 | 1 | 0 | 0 |
| 1 | 0 | 0 | 0 | 1 | 0 | 0 | 1 | 0 | 1 | 1 | 0 | 0 |
| 1 | 0 | 0 | 0 | 1 | 1 | 0 | 0 | 1 | 1 | 1 | 0 | 0 |
| 1 | 0 | 0 | 0 | 1 | 0 | 0 | 1 | 0 | 1 | 1 | 0 | 0 |
| 1 | 0 | 0 | 0 | 0 | 0 | 1 | 0 | 0 | 1 | 1 | 0 | 0 |
| 1 | 0 | 0 | 0 | 0 | 0 | 0 | 0 | 0 | 0 | 0 | 1 | 1 |
| 1 | 0 | 0 | 0 | 0 | 0 | 1 | 0 | 0 | 0 | 0 | 1 | 1 |
| 1 | 0 | 0 | 0 | 1 | 0 | 0 | 1 | 0 | 0 | 0 | 1 | 1 |
| 1 | 0 | 0 | 0 | 1 | 1 | 0 | 0 | 1 | 0 | 0 | 1 | 1 |
| 1 | 0 | 0 | 0 | 1 | 0 | 0 | 1 | 0 | 0 | 0 | 1 | 1 |

-continued

| SW1-LO | SW2-LO | SW3-LO | SW1-IN | SW2-IN | SW3-IN | SW1-HI | SW2-HI | SW3-HI | SW-A1 | SW-A2 | SW-B1 | SW-B2 |
|---|---|---|---|---|---|---|---|---|---|---|---|---|
| 1 | 0 | 0 | 0 | 0 | 0 | 1 | 0 | 0 | 0 | 0 | 1 | 1 |
| 0 | 1 | 0 | 0 | 0 | 0 | 0 | 0 | 0 | 1 | 1 | 0 | 0 |
| 0 | 1 | 0 | 0 | 0 | 0 | 0 | 1 | 0 | 1 | 1 | 0 | 0 |
| 0 | 1 | 0 | 0 | 0 | 1 | 0 | 0 | 1 | 1 | 1 | 0 | 0 |
| 0 | 1 | 0 | 1 | 0 | 1 | 1 | 0 | 0 | 1 | 1 | 0 | 0 |
| 0 | 1 | 0 | 0 | 0 | 1 | 0 | 0 | 1 | 1 | 1 | 0 | 0 |
| 0 | 1 | 0 | 0 | 0 | 0 | 0 | 1 | 0 | 1 | 1 | 0 | 0 |
| 0 | 1 | 0 | 0 | 0 | 0 | 0 | 0 | 0 | 0 | 0 | 1 | 1 |
| 0 | 1 | 0 | 0 | 0 | 0 | 0 | 1 | 0 | 0 | 0 | 1 | 1 |
| 0 | 1 | 0 | 0 | 0 | 1 | 0 | 0 | 1 | 0 | 0 | 1 | 1 |
| 0 | 1 | 0 | 1 | 0 | 1 | 1 | 0 | 0 | 0 | 0 | 1 | 1 |
| 0 | 1 | 0 | 0 | 0 | 1 | 0 | 0 | 1 | 0 | 0 | 1 | 1 |
| 0 | 1 | 0 | 0 | 0 | 0 | 0 | 1 | 0 | 0 | 0 | 1 | 1 |
| 0 | 0 | 1 | 0 | 0 | 0 | 0 | 0 | 0 | 1 | 1 | 0 | 0 |
| 0 | 0 | 1 | 0 | 0 | 0 | 0 | 1 | 1 | 1 | 1 | 0 | 0 |
| 0 | 0 | 1 | 1 | 0 | 0 | 1 | 0 | 0 | 1 | 1 | 0 | 0 |
| 0 | 0 | 1 | 1 | 1 | 0 | 0 | 1 | 0 | 1 | 1 | 0 | 0 |
| 0 | 0 | 1 | 1 | 0 | 0 | 1 | 0 | 0 | 1 | 1 | 0 | 0 |
| 0 | 0 | 1 | 0 | 0 | 0 | 0 | 1 | 1 | 1 | 1 | 0 | 0 |
| 0 | 0 | 1 | 0 | 0 | 0 | 0 | 0 | 0 | 0 | 0 | 1 | 1 |
| 0 | 0 | 1 | 0 | 0 | 0 | 0 | 1 | 0 | 0 | 0 | 1 | 1 |
| 0 | 0 | 1 | 1 | 0 | 0 | 1 | 0 | 0 | 0 | 0 | 1 | 1 |
| 0 | 0 | 1 | 1 | 1 | 0 | 0 | 1 | 0 | 0 | 0 | 1 | 1 |
| 0 | 0 | 1 | 1 | 0 | 0 | 1 | 0 | 0 | 0 | 0 | 1 | 1 |
| 0 | 0 | 1 | 0 | 0 | 0 | 0 | 0 | 1 | 0 | 0 | 1 | 1 |

Figure 6:
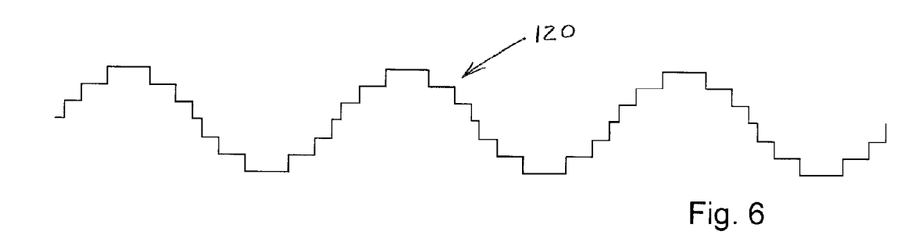
FIG. 6 illustrates a resulting waveform showing the first, second, and third AC cycles.

The sequencing of the switches shown in the table results in first, second, and third full AC cycles. FIG. 6 shows the 36 step resulting AC waveform. The resulting waveform shows the first, second, and third AC cycles, with the peak voltage occurring when all three batteries 102, 104, 106 are in series with the negative connected to low bus 110 and the positive connected to high bus 112. The first AC cycle begins with first battery 102; the second AC cycle begins with second battery 104; and the third AC cycle begins with third battery 106.

In more detail, as shown in the table, the sequence starts out by connecting the negative terminal of battery 102 to the low bus 110, with no batteries connected to the high bus 112 (0V output). The second step connects battery 102 positive to the high bus 112. The third step shows the switch connections for battery 102 in series with battery 104 with the resulting voltage on the high bus 112. The fourth step shows batteries 102, 104, and 106 in series, again with the resulting series voltage on the high bus 112. This connection state is the peak voltage output of the series connection, and the next steps successively remove batteries from the series connection. The fifth step has the same connections as the third step (battery 102 in series with battery 104). The sixth step has just battery 102 connected. These first six steps generate the top half of the first AC cycle.

Steps 7-12 are then a repeat of steps 1-6, but with the switches SW-A1, SW-A2, SW-B1, SW-B2 of the H-bridge reversed to reverse the polarity of the output at receptacle 114. Steps 7-12 repeat the successive series connection, and the subsequent disconnection of the battery voltages, with the current going in the opposite direction through the 120V AC receptacle 114. These six steps (steps 7-12) generate the bottom half of the first AC cycle.

Steps 13-24 are the sequencing of the switches for the second AC cycle, which is similar to the first AC cycle (steps 1-12), except the series connection starts with battery 104 instead of battery 102. Starting each new AC cycle with a different battery is an important feature that may be implemented in embodiments of the invention, as this feature allows the loading on the batteries to be kept even. Put another way, if every cycle started with battery 102, for example, battery 102 would drain down before the other batteries, because it stays connected during the entire AC cycle, whereas the other batteries are only connected for a portion of the AC cycle. By rotating or changing the first DC voltage source in the series connection as the sequence of coordination steps is repeated, loading on all the batteries may be kept even. This is an example, and other approaches to balancing battery discharging are possible.

Finally, steps 25-36 show the switch sequencing for the third AC cycle, which starts with battery 106.

Figure 7:
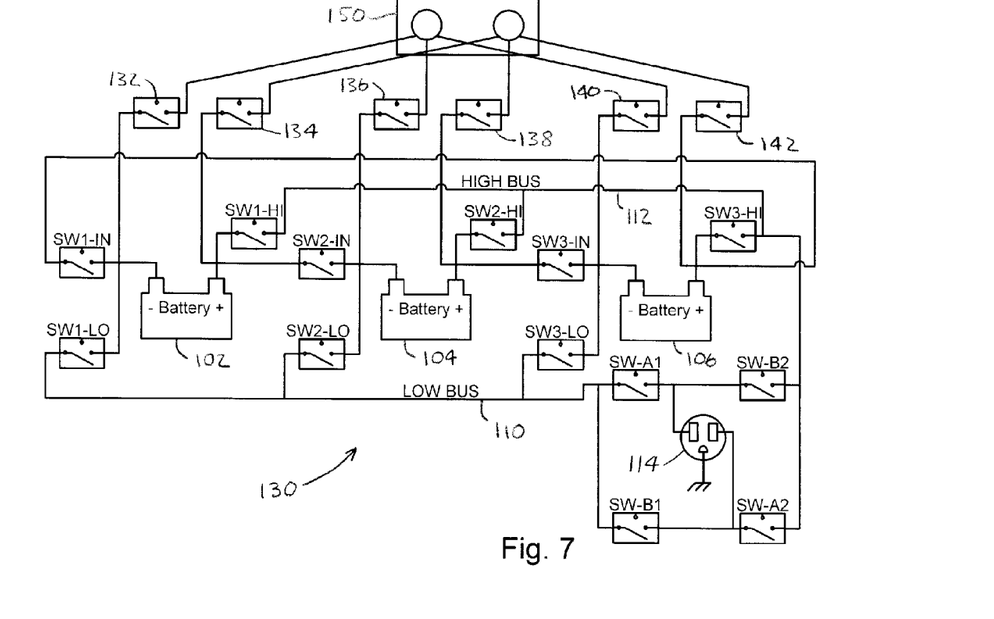
FIG. 7 illustrates a schematic diagram of a series connected inverter including switches for battery charging using DC sources.

FIG. 7 illustrates a schematic diagram of a series connected inverter 130 including switches for battery charging using DC sources. Inverter 130 is similar to inverter 100 of FIG. 5, but further includes pairs of power switches arranged to allow selective connection of a corresponding DC voltage source to a DC charging voltage. More specifically, power switches 132 and 134 allow selective connection of charging terminal block 150 to battery 102. Power switches 136 and 138 allow selective connection of charging terminal block 150 to battery 104. Power switches 140 and 142 allow selective connection of charging terminal block 150 to battery 106. One method for charging involves closing only those charging switches on batteries that are not currently being used to generate the series output voltage. This means that as batteries are added to and removed from the series connection, the charging switches would also change, and only connect the currently unused batteries to the charging terminal block 150.

Figure 8:
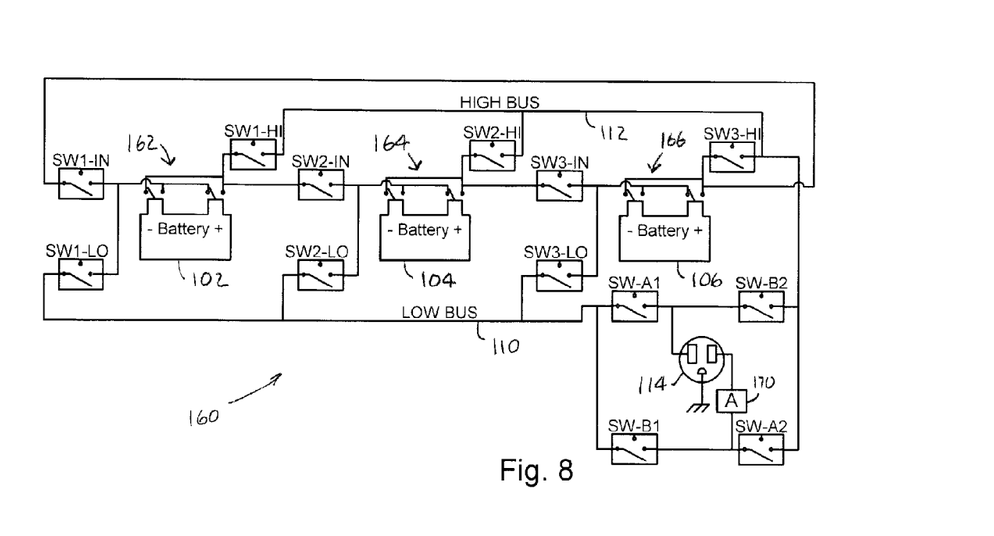
FIG. 8 illustrates a schematic diagram of a series connected inverter including relays for battery charging directly from an AC source.

FIG. 8 illustrates a schematic diagram of a series connected inverter 160 including relays for battery charging directly from an AC source. Inverter 160 is similar to inverter 100 of FIG. 5, but additionally includes switch mechanisms 162, 164, 166, which may take the form of relays. The reversing relays 162, 164, 166 facilitate charging batteries 102, 104, 106 directly from the high voltage AC supplied by the AC receptacle 114. Reversing relays are needed in the illustrated embodiment because all of the other switches will typically be implemented with solid state devices that conduct current in only one direction. Thus, to use the H-bridge SW-A1, SW-A2, SW-B1, SW-B2 and the other switches, current must flow into the battery on the low bus conductors 110 and out of the battery on the high bus conductors 112 and the battery terminals must be reversed.

In more detail, relays 162, 164, 166 or other suitable switch mechanisms are arranged for reversing connections to the DC voltage sources. For example, relay 162 has a first position (not shown) in which the negative terminal is selectively connectable to low bus 110 through switch SW1-LO, and the positive terminal is selectively connectable to high bus 112 through switch SW1-HI. The relay 162 has a second position (shown) in which the negative terminal is selectively connectable to high bus 112 and the positive terminal is selectively connectable to low bus 110.

Additional circuitry 170 measures the instantaneous charging current being delivered, and this measurement is used to determine when the next battery should be added in series, thus sending the charging current through both batteries. In this manner, batteries would be added in series as the incoming AC voltage increases during the positive half of the AC cycle. When the AC voltage begins to decrease, the controller would determine when to drop batteries from the series connection, in order to continue to force charging current into the remaining series connected batteries. For the negative half of the AC cycle, the H-bridge would reverse such that essentially only rectified AC would be supplied on the low bus 110 and high bus 112.

Figure 9:
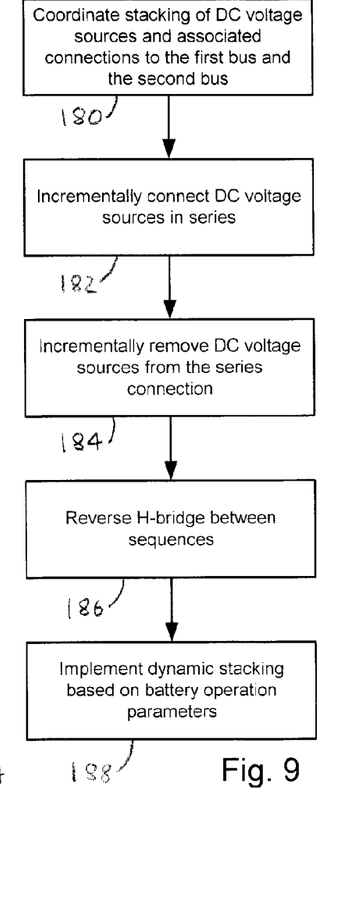
FIG. 9 is a block diagram illustrating a method of inverting DC voltage to AC voltage by stacking of DC voltage sources from a series of DC voltage sources in an embodiment of the invention.

FIG. 9 is a block diagram illustrating a method of inverting DC voltage to AC voltage by stacking DC voltage sources from a series of DC voltage sources in an embodiment of the invention. It is appreciated that the invention comprehends an apparatus for inverting DC voltage to AC voltage that may be implemented in a variety of ways, with any appropriate combination of the features described herein depending on the application. As well, such an apparatus may be operated in a variety of ways, with the described arrangement where DC voltage sources are incrementally connected in series and incrementally removed from the series connection being simply an example. In FIG. 9, block 180 indicates coordinating stacking of DC voltage sources and associated connections to the first bus and the second bus. At block 182, DC voltage sources are incrementally connected in series, and at block 184, DC voltage sources are incrementally removed from the series connection. Block 186 indicates reversing the H-bridge between sequences. Block 188 indicates the implementation of dynamic stacking based on battery operation parameters. For example, the sequence of coordination steps for generating the AC cycles may be continuously repeated while varying a first DC voltage source in the series connection. In another example, the sequencing may take place such that batteries having problems are not used. After a problem battery is replaced, that battery may then be used in the sequencing.

Embodiments of the invention have many advantages. For example, the example topology described above frees the inverter from powering the non-current sourcing nodes, and directs the resulting current around the deactivated nodes using the buses so as to avoid unnecessary voltage drops. The result provides a more efficient operation, and allows as many additional nodes to be added as desired, without suffering any additional loses due to node powering or parasitic node voltage drops.

Figure 10:
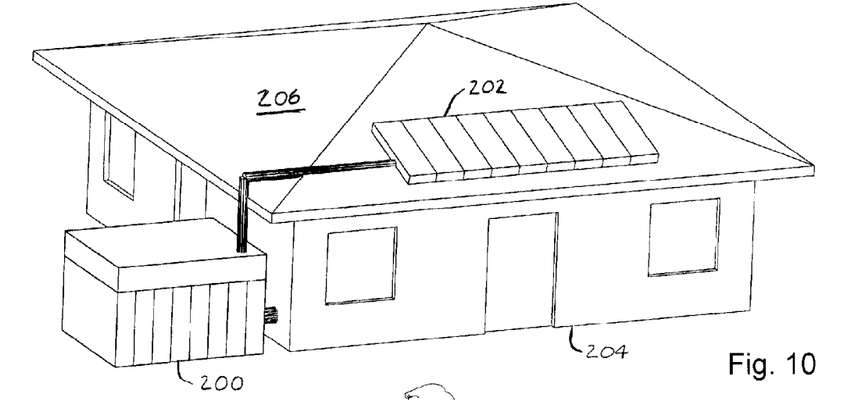
FIG. 10 illustrates an apparatus for inverting DC voltage to AC voltage in an embodiment of the invention, showing a house getting power from a large inverter hooked to solar cells on the roof.

FIG. 10 illustrates an apparatus 200 for inverting DC voltage to AC voltage in an embodiment of the invention. Apparatus 200 includes a large inverter hooked to solar cells 202 on the roof 206 of a house 204. It is appreciated that apparatus 200 is not limited to solar cells 202. For example, apparatus 200 could include batteries in appropriate applications.

Figure 11:
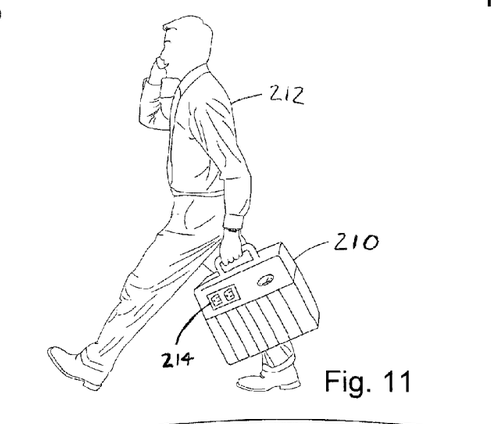
FIG. 11 illustrates an apparatus for inverting DC voltage to AC voltage in an embodiment of the invention, showing a portable inverter and a man carrying it.

FIG. 11 illustrates an apparatus 210 in an embodiment of the invention, in the form of a portable inverter, shown being carried by man 212. Apparatus 210 includes a compact, portable housing. At least one plug outlet 214 is located on the housing, with the AC voltage output being provided at the plug outlet. Apparatus 210 may include a series of batteries composing the series of DC voltage sources. In one contemplated approach, the housing and batteries could be implemented such that the same housing could accommodate battery arrangements of different capacities. It is appreciated that the housing may include any suitable power connection. For example, the user may hook the AC line to a terminal strip or another type of connector that is not necessarily a plug.

Figure 12:
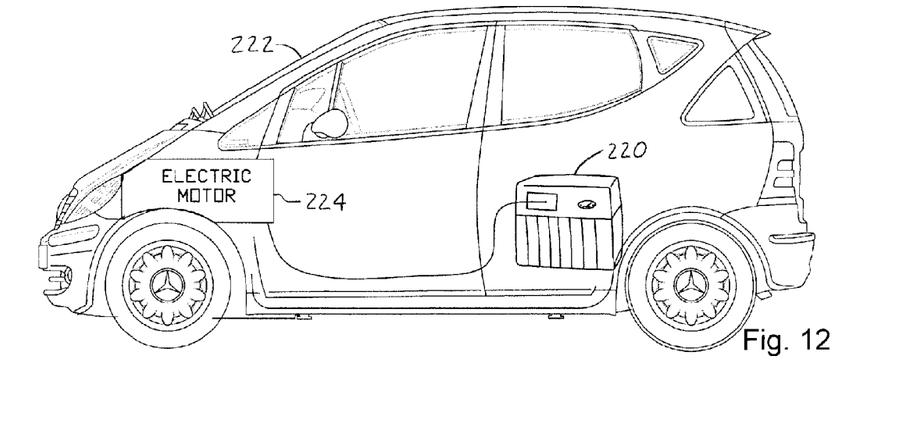
FIG. 12 illustrates an apparatus for inverting DC voltage to AC voltage in an embodiment of the invention, showing a hybrid vehicle.

FIG. 12 illustrates an apparatus 220 shown located in a hybrid vehicle 222, powering electric motor 224.

It is appreciated that other applications of the invention are contemplated. Although FIGS. 10-12 illustrate examples of apparatuses, embodiments of the invention may be implemented in other applications where AC power is needed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for inverting DC voltage to AC voltage by stacking of DC voltage sources from a series of DC voltage sources, the apparatus comprising:
  a plurality of power switches including first power switches, second power switches, and third power switches, wherein (i) the first power switches are arranged to allow selective connection of adjacent DC voltage sources in the series to provide stacking of DC voltage sources, (ii) each second power switch is arranged to allow selective connection of a first bus to a corresponding location between adjacent DC voltage sources, and (iii) each third power switch is arranged to allow selective connection of a second bus to a corresponding location between adjacent DC voltage sources; and
  a controller operative to control the plurality of power switches to produce an AC voltage output by coordinating stacking of DC voltage sources and associated connections to the first bus and the second bus, wherein coordinating the stacking of DC voltage sources includes:
    coordinating a sequence of steps where DC voltage sources are incrementally connected in series and incrementally removed from the series connection; and
    continuously repeating the sequence of steps while changing a first DC voltage source in the series connection.

2. The apparatus of claim 1 wherein the plurality of power switches further includes fourth power switches arranged to form an H-bridge having an input side connected to the first and second buses and having an output side.

3. The apparatus of claim 2 wherein the controller is further operative such that coordinating stacking of DC voltage sources includes reversing the H-bridge between sequences.

4. The apparatus of claim 1 further comprising:
  a series of batteries composing the series of DC voltage sources.

5. The apparatus of claim 1 further comprising:
  a plurality of circuits including the plurality of power switches, each circuit including at least one first power switch, at least one second power switch, and at least one third power switch.

6. The apparatus of claim 5 further comprising:
a plurality of printed circuit boards, each printed circuit board including at least one of the circuits.

7. The apparatus of claim 6 wherein the plurality of printed circuit boards are connected together in a series.

8. The apparatus of claim 7 wherein each printed circuit board is associated with and connectable to both terminals of a DC voltage source.

9. The apparatus of claim 6 wherein each printed circuit board is associated with and connectable to a DC voltage source, and includes a battery monitor circuit for measuring at least one operating parameter of the associated DC voltage source.

10. The apparatus of claim 1 further comprising:
a master circuit including the controller; and
a plurality of slave circuits including the plurality of power switches, each slave circuit including at least one first power switch, at least one second power switch, and at least one third power switch.

11. The apparatus of claim 10 further comprising:
a master printed circuit board including the master circuit; and
a plurality of slave printed circuit boards, each slave printed circuit board including at least one of the slave circuits.

12. An apparatus for inverting DC voltage to AC voltage by stacking of DC voltage sources from a series of DC voltage sources, the apparatus comprising:
a plurality of circuits including a plurality of power switches, the plurality of power switches including first power switches, second power switches, third power switches, and fourth power switches, wherein (i) the first power switches are arranged to allow selective connection of adjacent DC voltage sources in the series to provide stacking of DC voltage sources, (ii) each second power switch is arranged to allow selective connection of a first bus to a corresponding location between adjacent DC voltage sources, (iii) each third power switch is arranged to allow selective connection of a second bus to a corresponding location between adjacent DC voltage sources, and (iv) the fourth power switches including a plurality of pairs of power switches and wherein each pair of power switches is arranged to allow selective connection of a corresponding DC voltage source to a DC char in voltage for charging the DC voltage source;
wherein each circuit includes at least one first power switch, at least one second power switch, at least one third power switch, and at least one fourth power switch.

13. The apparatus of claim 12, further comprising:
a controller operative to control the plurality of power switches to produce an AC voltage output by coordinating stacking of DC voltage sources and associated connections to the first bus and the second bus.

14. The apparatus of claim 13 wherein coordinating stacking of DC voltage sources is conducted so as to implement dynamic stacking based on battery operation parameters.

15. The apparatus of claim 13 wherein coordinating stacking of DC voltage sources includes a sequence of coordination steps where DC voltage sources are incrementally connected in series and incrementally removed from the series connection, and wherein the sequence of coordination steps is continuously repeated while changing a first DC voltage source in the series connection.

16. The apparatus of claim 12 further comprising:
a plurality of switch mechanisms arranged for reversing connections to the DC voltage sources, wherein each switch mechanism is associated with a corresponding DC voltage source having first and second terminals, the switch mechanism having a first position in which the first terminal is selectively connectable to the first bus by a corresponding second power switch and the second terminal is selectively connectable to the second bus by a corresponding third power switch, and the switch mechanism having a second position in which the first terminal is selectively connectable to the second bus by the corresponding third power switch and the second terminal is selectively connectable to the first bus by the corresponding second power switch.

17. An apparatus for inverting DC voltage to AC voltage by stacking of DC voltage sources from a series of DC voltage sources, the apparatus comprising:
a compact, portable housing;
at least one power connection on the housing;
a plurality of power switches disposed in the housing and including first power switches, second power switches, and third power switches, wherein (i) the first power switches are arranged to allow selective connection of adjacent DC voltage sources in the series to provide stacking of DC voltage sources, (ii) each second power switch is arranged to allow selective connection of a first bus to a corresponding location between adjacent DC voltage sources, and (iii) each third power switch is arranged to allow selective connection of a second bus to a corresponding location between adjacent DC voltage sources; and
a controller operative to control the plurality of power switches to produce an AC voltage output by coordinating stacking of DC voltage sources and associated connections to the first bus and the second bus, the AC voltage output being provided to the at least one power connection;
wherein coordinating the stacking of DC voltage sources includes executing a sequence of coordination steps where DC voltage sources are incrementally connected in series and incrementally removed from the series connection and continuously repeating the sequence of coordination steps while changing a first DC voltage source in the series connection.

18. The apparatus of claim 17 further comprising:
a series of batteries composing the series of DC voltage sources.

* * * * *

UNITED STATES PATENT AND TRADEMARK OFFICE
CERTIFICATE OF CORRECTION

| | | |
|---|---|---|
| PATENT NO. | : 8,536,734 B2 | Page 1 of 1 |
| APPLICATION NO. | : 12/760160 | |
| DATED | : September 17, 2013 | |
| INVENTOR(S) | : Douglas Johnson et al. | |

It is certified that error appears in the above-identified patent and that said Letters Patent is hereby corrected as shown below:

In the Claims

Column 11, Line 45, Claim 12:

After "DC" delete "char in" and
Insert -- charging --.

Signed and Sealed this
Thirteenth Day of May, 2014

Michelle K. Lee
*Deputy Director of the United States Patent and Trademark Office*